Jan. 9, 1951  C. S. ASH  2,537,181
VEHICLE WHEEL
Filed July 3, 1946  2 Sheets-Sheet 1

INVENTOR
CHARLES S. ASH
BY
Morgan, Finnegan & Durham
ATTORNEYS

Jan. 9, 1951  C. S. ASH  2,537,181
VEHICLE WHEEL
Filed July 3, 1946  2 Sheets-Sheet 2

INVENTOR
CHARLES S. ASH
BY
Morgan, Finnegan & Durham
ATTORNEYS

Patented Jan. 9, 1951

2,537,181

UNITED STATES PATENT OFFICE 2,537,181

VEHICLE WHEEL

Charles S. Ash, Milford, Mich.

Application July 3, 1946, Serial No. 681,367

5 Claims. (Cl. 301—13)

The present invention relates to improvements in vehicle wheels, and more particularly to such wheels adapted to demountably mount a pair of road engaging tires.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

The present invention has for its object the provision of a dual demountable rim type of vehicle wheel of sturdy construction which is particularly adapted to use on heavy duty vehicles. A further object of the invention is the provision of such a wheel that is simple and economical to fabricate but of sufficient strength and durability for the heaviest type of uses.

In general the present invention may be said to utilize some of the improvements and advantages disclosed in my United States Patent Number 2,355,941 issued August 15, 1944 for the provision of a dual tired vehicle wheel. The patent referred to discloses a bogie wheel of great strength and simplicity of design, and may be referred to as supplementing the present disclosure in so far as common or similar elements and fabrication methods are involved, particular reference being had to the embodiment of Figure 3 of that patent. The present invention, however, provides a wheel for an entirely different purpose in that it is adapted to carry a plurality of demountable tires and braking means for the wheel, and the problems presented and solved and the inventions involved are separate and distinct.

Figure 1:
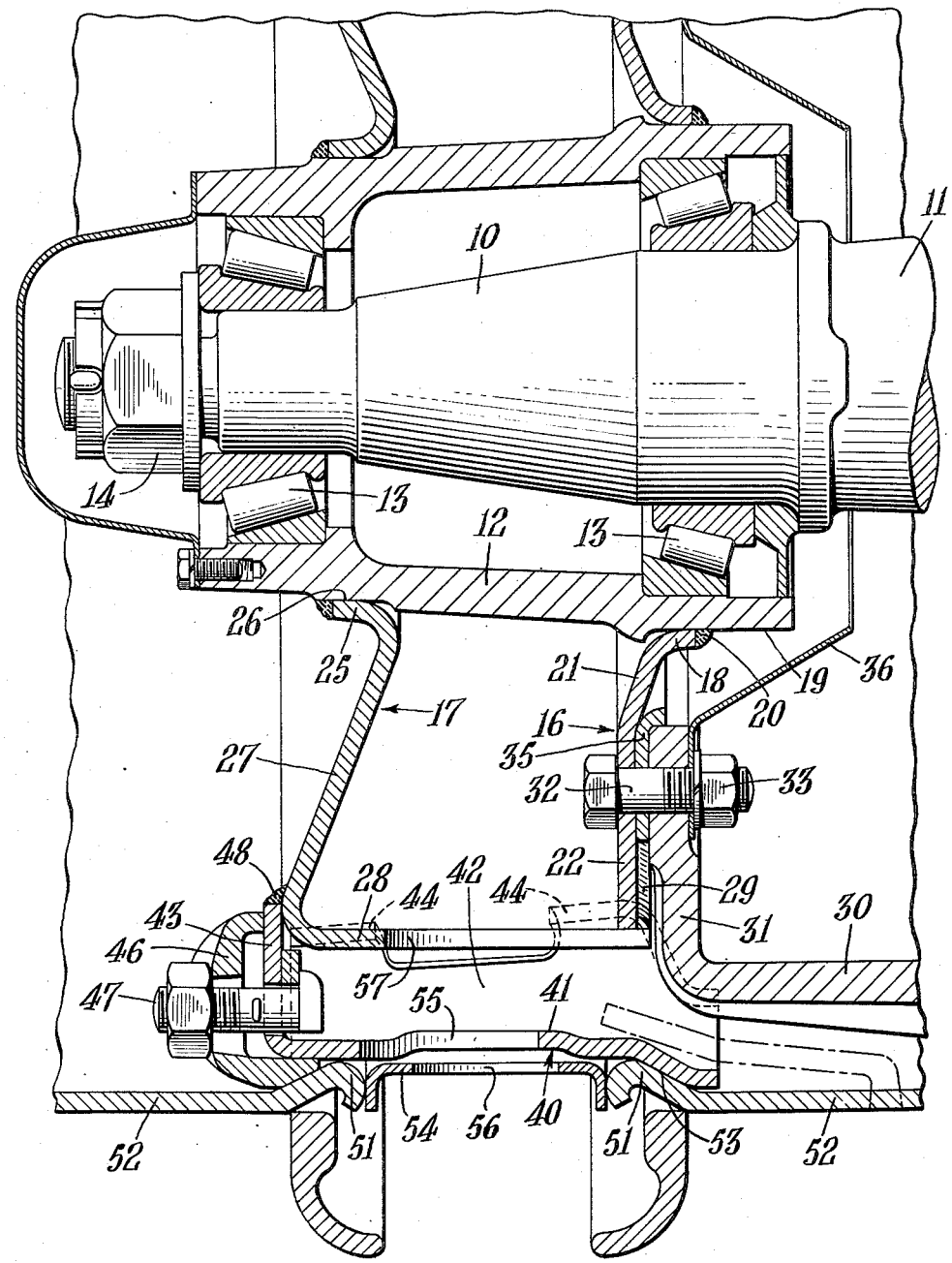
Figure 1 is a vertical cross sectional view of a typical and illustrative embodiment of the present invention.

Referring now in detail to the illustrative embodiment of the present invention shown by way of example in the accompanying drawings, and referring first to the embodiment of Figure 1, the vehicle wheel is shown as mounted on the reduced end or spindle 10 of a vehicle axle 11. The vehicle wheel is provided with a tubular hub element 12, and this is mounted in conventional fashion upon spindle 10 by means of anti-friction bearings 13, the hub and bearing assembly being held in place by nut 14 on the end of the axle.

The central body portion of the wheel is formed of a pair of elements which may be made from single flat circular discs of metal and formed by stamping or drawing operation. As shown in Figure 1 of the drawings, these elements comprise the inner and outer web elements 16 and 17 respectively. The inner element 16 is formed as shown at its inner periphery with a short integral cylindrical portion 18 adapted to seat on the finished outer cylindrical surface portion 19 of hub 12 and preferably to have a tight press fit thereon. The hub and disc are joined by a circular weld 20 at the end of cylindrical portion 18.

Immediately radially outwardly of its portion 18 the web element 16 is formed in a frusto-conical portion 21 to contribute greater strength to the composite wheel structure. Through its central and outer portion element 16 is formed in a portion 22 which lies substantially in a radial plane of the wheel.

The outer web element 17 of the wheel body is somewhat similarly formed, having an inner peripheral, outwardly axially turned cylindrical portion 25 tight press fitted on finished external surface 26 of hub 12 and welded thereto by a circular weld. The entire radial extent of web element 17 is formed as a frusto-conical portion 27, which is integral radially inwardly with portion 25 just described, and integral radially outwardly with an axially inwardly turned extended cylindrical portion 28.

Portion 28, as shown in the drawings, extends axially inwardly to the web element 16, overlaps and is supported by the outer periphery of said element, and is welded thereto by a circular weld as indicated at 29. There is thus provided an axially extending substantially cylindrical surface at the outer periphery of the central body portion of the wheel upon which spoke-like members may be mounted to receive a pair of tire rims.

Braking means are provided for the wheel, and as embodied comprise a brake drum 30 of conventional type, having an inwardly radially extending head or flange portion 31 by which the drum is secured to the plane portion 22 of web 16 by means of a plurality of bolts 32 and nuts 33. A plurality of semi-circular spacing elements 35 are provided between drum flange 31 and web element 16, each apertured to receive a pair of the drum mounting bolts 32. The ends of each of these spacing elements are spaced apart from the ends of the adjacent element, providing paths for excess lubricant from the wheel bearings radially outwardly of the wheel between the brake drum flange and web element 16. An annular deflector member 36 is secured by bolts 32 as shown and is formed to catch excess bearing lubricant, channelling it outwardly as just described and preventing its access to the interior of the brake. A more detailed showing of the spacing elements 35 may be seen in my copending patent application Serial No. 677,012, filed June 15, 1946.

Means are provided for mounting dual demountable tires on the composite wheel body described, and as embodied comprise spoke members designated generally by the numeral 40 which may be simply formed from a flat blank of metal to provide a tapered or wedge shaped configuration as viewed from the top with upper, or spoke end, surfaces 41, side walls 42 and end walls 43. The side walls 42 are formed with legs 44 extending radially inwardly and flared to cooperatingly curve with and seat on the cylindrical surface of axially extending portion 28 of outer web 17. A plurality of the spoke members 40 are circumferentially spaced the periphery of the composite wheel body, each being axially disposed along the cylindrical portion 28 and welded thereto at the legs 44.

The end walls 43 of spokes 40 are formed to lie in a substantially radial plane to form seats for rim mounting lugs 46, being apertured to receive lug bolts 47. The spokes are also welded to outer web element 17 by means of these end walls, as indicated at 48.

The outer radial spoke end surfaces 41 are formed at their axially outer extent in plane surfaces to receive the axially extending portions of lugs 46 and the inwardly turned head or shoulder 51 of an outer pneumatic tire rim 52. The axially inner extent of spoke ends surfaces 41 are formed with inclined surfaces 53 against which the shoulder 51 of an inner tire rim 52 is adapted to seat. A cylindrical spacing member 54 is positioned over the central portions of the spoke member 40 and engages both rims 52 at their shoulders 51, cooperating with lugs 46 and inclined spoke surfaces 53 to securely but removably mount the rims on the vehicle wheel.

An aperture 55 is provided in the central portion of each spoke end surface 41, and spacing member 54 is similarly apertured as indicated at 56 to have the apertures register with apertures 55. Ventilation is thus afforded between the tires, through the spokes and out the open, axially inner ends of the spokes over the brake drum, and air communication within the spoke is provided between legs 44 of side walls 42. Furthermore, direct ventilation for the brake drum is had between the spokes 40 over the cylindrical peripheral portion 28 of the wheel body, and the angular relationship of the walls 42 with respect to the axis of the wheel provides a pumping action for ventilation of the brake drum.

The cylindrical peripheral portion 28 of outer web element 17 is provided with a notched place or aperture 57 positioned between each pair of spokes so that access may be had to the interior of the wheel and the heads of bolts 32 which mount drum 30 on the wheel.

Figure 2:
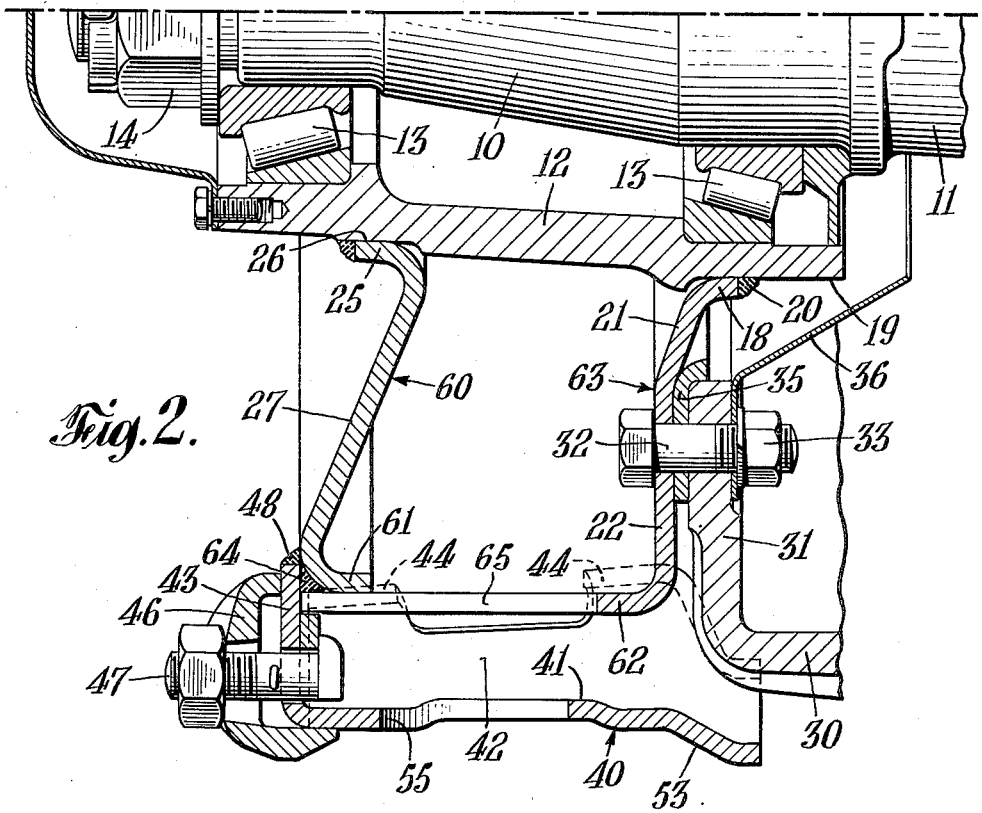
Figure 2 is a vertical cross sectional view of a modified form of the present invention.
Figure 3:
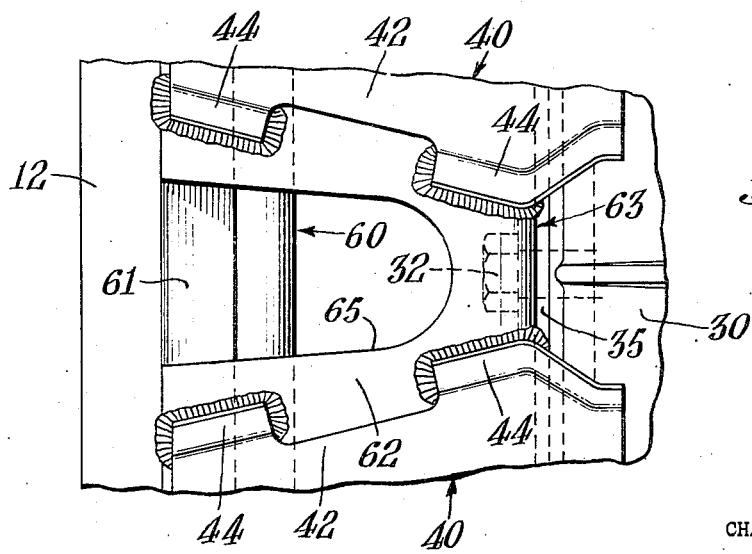
Figure 3 is a fragmentary plan view of the embodiment of the invention shown in Figure 2 showing the construction of the wheel between the spoke ends.

The embodiment of the invention shown in Figures 2 and 3 of the drawings is entirely similar to that of Figure 1 just described, except for the peripheral formation of the wheel central body portion upon which the hollow, tapered spoke members are mounted. As shown, the outer web element 60 has an integral axially inwardly turned portion 61 at its outer periphery upon which is supported the outer end of an integral, cylindrical peripheral portion 62 of the inner web element 63. The members are joined by welding at 64, and the spokes 40 are mounted on the exterior surface of portion 62, as already explained for the first embodiment of the invention. The peripheral portion 62 is apertured as indicated at 65 between the spokes for access to the interior of the wheel, and the other elements of the wheel are entirely similar or identical to the embodiment of Figure 1 of the drawings.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising an elongated hub, a pair of radially extending webs secured to the hub in spaced apart relationship, one of said webs having an integral axially extending cylindrical portion at its outer periphery extending toward the other web, overlapping the outer periphery thereof and secured thereto, and a plurality of axially and radially extending spoke members circumferentially spaced apart and secured to said cylindrical portion each said spoke member being formed of a single blank of material formed to provide a plane axially outer wall to seat a rim mounting lug, a pair of axially extending side walls seated on said cylindrical portion, a top wall having axially inner and outer surfaces to receive respective tire rims, and being open at the axially inner end.

2. A vehicle wheel comprising an elongated hub, a pair of radially extending webs secured to the hub in spaced apart relationship, one of said webs having an inclined radially extending body portion and an integral short axially turned outer peripheral portion and the other of said webs having a radially extending body portion plane through the major part of its radial extent and an integral axially extending cylindrical peripheral portion at its outer periphery extending toward the other web, overlapping said short peripheral portion and welded thereto, and a plurality of axially and radially extending spoke members circumferentially spaced apart and secured to said cylindrical portion each said spoke member being formed of a single blank of material formed to provide a plane axially outer wall to seat a rim mounting lug, a pair of axially extending side walls seated on said cylindrical portion, and a top wall having axially inner and outer surfaces to receive respective tire rims.

3. A vehicle wheel comprising an elongated hub, a pair of radially extending webs secured to the hub in spaced apart relationship, the axially outer of said webs having an inclined radially extending body portion and an integral axially extending cylindrical portion at its outer periphery extending toward the axially inner web overlapping the outer periphery thereof and welded thereto, and a plurality of axially and radially extending spoke members circumferentially spaced apart and secured to said cylindrical portion each said spoke member being formed of a single blank of material formed to provide a plane axially outer wall to seat a rim mounting lug, a pair of axially extending side walls seated on said cylindrical portion, and a top wall having axially inner and outer surfaces to receive respective tire rims.

4. A vehicle wheel comprising an elongated hub, a pair of radially extending webs secured to the hub in spaced apart relationship, the axially inner of said webs having a radially extending body portion plane through the major part of its radial extent and an integral axially extending cylindrical portion at its outer periphery extending toward the axially outer web overlapping the outer periphery thereof and welded thereto, and a plurality of axially and radially extending spoke members circumferentially spaced apart and secured to said cylindrical portion each said spoke member being formed of a single blank of material formed to provide a plane axially outer wall to seat a rim mounting lug, a pair of axially extending side walls seated on said cylindrical portion, and a top wall having axially inner and outer surfaces to receive respective tire rims.

5. A vehicle wheel comprising an elongated hub, a pair of radially extending webs secured to the hub in spaced apart relationship, the axially outer of said webs having an inclined radially extending body portion and a short, integral axially inwardly turned flange at the outer periphery thereof, the axially inner of said webs having an integral axially extending cylindrical portion at its outer periphery extending toward the outer web, overlapping and welded to said peripheral flange, and a plurality of axially and radially extending spoke members circumferentially spaced apart and secured to said cylindrical portion each said spoke member being formed of a single blank of material formed to provide a plane axially outer wall to seat a rim mounting lug, a pair of axially extending side walls seated on said cylindrical portion, and a top wall having axially inner and outer surfaces to receive respective tire rims.

CHARLES S. ASH.

REFERENCES CITED

The following references are of record in the file of this patent:

UNITED STATES PATENTS

| Number | Name | Date |
| --- | --- | --- |
| 1,539,982 | Williams | June 2, 1925 |
| 2,055,648 | Arnold | Sept. 8, 1936 |
| 2,150,810 | Slick | Mar. 14, 1939 |
| 2,158,709 | Trumble | May 16, 1939 |